United States Patent
Sakakura et al.

[11] Patent Number: 5,850,736
[45] Date of Patent: *Dec. 22, 1998

[54] HYDROSTATIC TRANSMISSION

[75] Inventors: Shinya Sakakura; Ryota Ohashi; Shigenori Sakikawa, all of Amagasaki, Japan

[73] Assignee: Kanzaki Kokyukoki Mfg. Co. Ltd., Japan

[ * ] Notice: The term of this patent shall not extend beyond the expiration date of Pat. No. 5,588,294.

[21] Appl. No.: 730,657

[22] Filed: Oct. 11, 1996

Related U.S. Application Data

[63] Continuation of Ser. No. 508,395, Jul. 31, 1995, Pat. No. 5,588,294.

[30] Foreign Application Priority Data

Sep. 13, 1994 [JP] Japan ................................. 6-218611

[51] Int. Cl.⁶ ............................ F16D 31/02; F16D 39/00
[52] U.S. Cl. ............................................. 60/464; 60/488
[58] Field of Search ............................. 60/464, 468, 488

[56] References Cited

U.S. PATENT DOCUMENTS

| | | |
|---|---|---|
| 3,583,157 | 6/1971 | Adams et al. . |
| 3,675,421 | 7/1972 | Asmus . |
| 3,699,678 | 10/1972 | Swanson et al. . |
| 3,748,859 | 7/1973 | Pruvot . |
| 3,788,078 | 1/1974 | Rubenstein . |
| 4,696,162 | 9/1987 | Williams . |
| 4,936,095 | 6/1990 | Ross et al. . |
| 5,333,451 | 8/1994 | Sakikawa et al. . |
| 5,588,294 | 12/1996 | Sakakura et al. ........................ 60/464 |

FOREIGN PATENT DOCUMENTS 61-27624  9/1982  Japan .

*Primary Examiner*—Hoang Nguyen
*Attorney, Agent, or Firm*—Sterne, Kessler, Goldstein & Fox P.L.L.C.

[57] ABSTRACT

A hydrostatic transmission constructed so that a check valve and a relief valve are made as compact as possible to supply oil to a closed circuit for connecting a hydraulic pump and a hydraulic motor, and to regulate maximum pressure in the closed circuit. A check valve and a relief valve are contained in a valve casing. A valve body of the relief valve is disposed opposite to a valve body of the check valve. A relief spring of the relief valve is retained by a cover detachably mounted to an open end of the valve casing, thereby facilitating pressure setting of the relief valve. The valve body of the relief valve is contained in a relief valve casing slidably disposed in the valve casing. A plunger, capable of urging the check valve in the opening direction via the relief valve casing, is provided in the cover, thereby enabling the check valve to be manually opened.

20 Claims, 5 Drawing Sheets

5,850,736

HYDROSTATIC TRANSMISSION

This application is a continuation of application Ser. No. 08/508,395, filed Jul. 31, 1995, now U.S. Pat. No. 5,588,294.

Background of the Invention

1. Field of the Invention

The present invention relates to a hydrostatic transmission provided with a closed circuit for connecting a hydraulic pump and a hydraulic motor. Relief valves and check valves are inserted into one side circuit and another side circuit (a low pressure side oil passage and a high pressure side oil passage) of the closed circuit.

2. Related At

Conventionally, according to the Japanese Patent Publication Gazette No. Sho 61-27624, in a hydrostatic transmission provided with a supply circuit for supplying oil to a closed circuit comprising one side circuit and another side circuit for connecting a hydraulic pump and a hydraulic motor, each side circuit is integrally provided with three members: (1) a direct-acting relief valve for regulating maximum pressure in the closed circuit; (2) a check valve for allowing oil supply only to the low pressure side of the closed circuit; and (3) a by-pass valve for short-circuiting the closed circuit to put the hydraulic pump in the no-load state. In brief, a valve body of the check valve itself is disposed at a poppet portion formed on an outer periphery of a relief valve casing containing therein the relief valve. The by-pass valve is constructed so that when a plunger is pushed, the poppet portion of the relief valve casing slides in the direction of lifting from the seat surface of the valve casing. The relief valve casing is slidably provided with the plunger and screwably mounted to a center section provided with a closed circuit.

The above-mentioned conventional hydrostatic transmission, however, is difficult to adjust a set pressure of the relief valve. In other words, to adjust the set pressure of the relief valve, it is necessary to outwardly extract the relief valve casing. However, the relief valve casino, contained in the valve casing, cannot solely be extracted therefrom because the poppet portion exists at the outer periphery of the relief valve casing, whereby the valve casing must first be removed from the center section, and the relief valve casing can then be extracted.

The relief valve is built up in the valve body of the check valve with a relief spring disposed within the relief valve casing. When the relief valve operates, relief oil passes through the relief valve casing to escape from the casing toward the low pressure side of the hydrostatic transmission. The flow of relief oil is hindered by the relief spring so as to deteriorate the pressure override property of the check valve.

SUMMARY OF THE INVENTION

An object of the present invention is to construct a hydrostatic transmission by connecting a hydraulic pump and a hydraulic motor in fluid communication with each other through a closed fluid circuit including a first side circuit and a second side circuit. The first and second side circuits include relief valves for regulating a maximum pressure in the closed circuit, and check valves for allowing oil to be supplied only to the low pressure side of the closed circuit. Each relief valve and each check valve are integrally provided to be as compact as possible in construction and easily detachable during maintenance. Pressure adjustment of each relief valve is simple to carry out.

In one embodiment of the invention, the check valve and relief valve are contained in a valve casing, and a valve body of the relief valve and of the check valve are disposed opposite to each other. A base of a relief spring of the relief valve is held by a cover mounted on an opening end of the valve casing in relation to being detachable and retractively adjustable The valve body of the relief valve faces a through bore provided in the valve body of the check valve, thereby forming an oil pressure acting chamber of the relief valve.

Such construction becomes compact because of disposing in series the check valve and relief valve in the valve casing, so that the set pressure or relief pressure of the relief valve can be simply set from the exterior. To set the relief pressure, all that is required is to release a lock nut and to change a thickness of a shim interposed between the cover and the base of the relief spring. The check valves and relief valves are in relation of being independent of each other, whereby oil relieved from the relief valve can flow directly to the low pressure side of the closed circuit without being subjected to any resistance, and the pressure override property can be improved.

In a second embodiment of the present invention, a relief valve casing, containing therein the relief valve, is slidably disposed within a valve casing. The valve body of the relief valve and check valve are disposed opposite to each other, and the check valve extends at the utmost end thereof to be close to or in proximity to an end face of the relief valve casing. The valve body of the relief valve faces a through bore formed in the valve body of the check valve so as to form an oil pressure acting chamber for the relief valve. A plunger is provided in a cover member detachably mounted to an open end of the valve casing. The plunger slidably moves the check valve, via the relief valve casing, in the seat-leaving or opening direction.

Such construction is suitable for adjusting a set pressure of the relief valve while having a by-pass function. A plunger, when pushed down to put the hydraulic pump in the no-load state, abuts against the utmost end of each relief valve casing to lead to mechanical opening of the check valve. Also, the cover is merely removed from the valve casing to enable the relief valve casing to be extracted, thereby enabling the relief pressure of the relief valve to be simple to adjust.

A third embodiment of the present invention is constructed so that a relief valve disposed in a valve casing is formed in a balance piston type of combination of a balance piston valve and a pilot valve. A seat surface of a valve body of a check valve disposed in the valve casing is formed at the balance piston valve. A valve body of the check valve extends at the utmost end to be close to or in proximity to an end face of the pilot valve. The valve body of the pilot valve faces a through bore through an orifice provided in the valve body of the check valve, thereby forming an oil pressure acting chamber for the pilot valve.

Such construction makes the relief valve of the balance piston type superior in the pressure override property to a relief valve of the direct-acting type. When the plunger is pushed down in order to put the hydraulic pump in the no-load state, the pilot valve is simultaneously pushed down so as to abut against the utmost end of the valve body of the check valve, thereby opening the check valve. Also, the cover member is merely removed from the valve casing to enable the pilot valve to be extracted, thereby enabling the relief pressure of the relief valve to be simple to adjust.

The above and further objects and novel features of the present invention will more fully appear from the following description when the same is read in connection with the accompanying drawings.

DETAILED DESCRIPTION OF THE PREFERRED EMBODIMENTS

Figure 1:
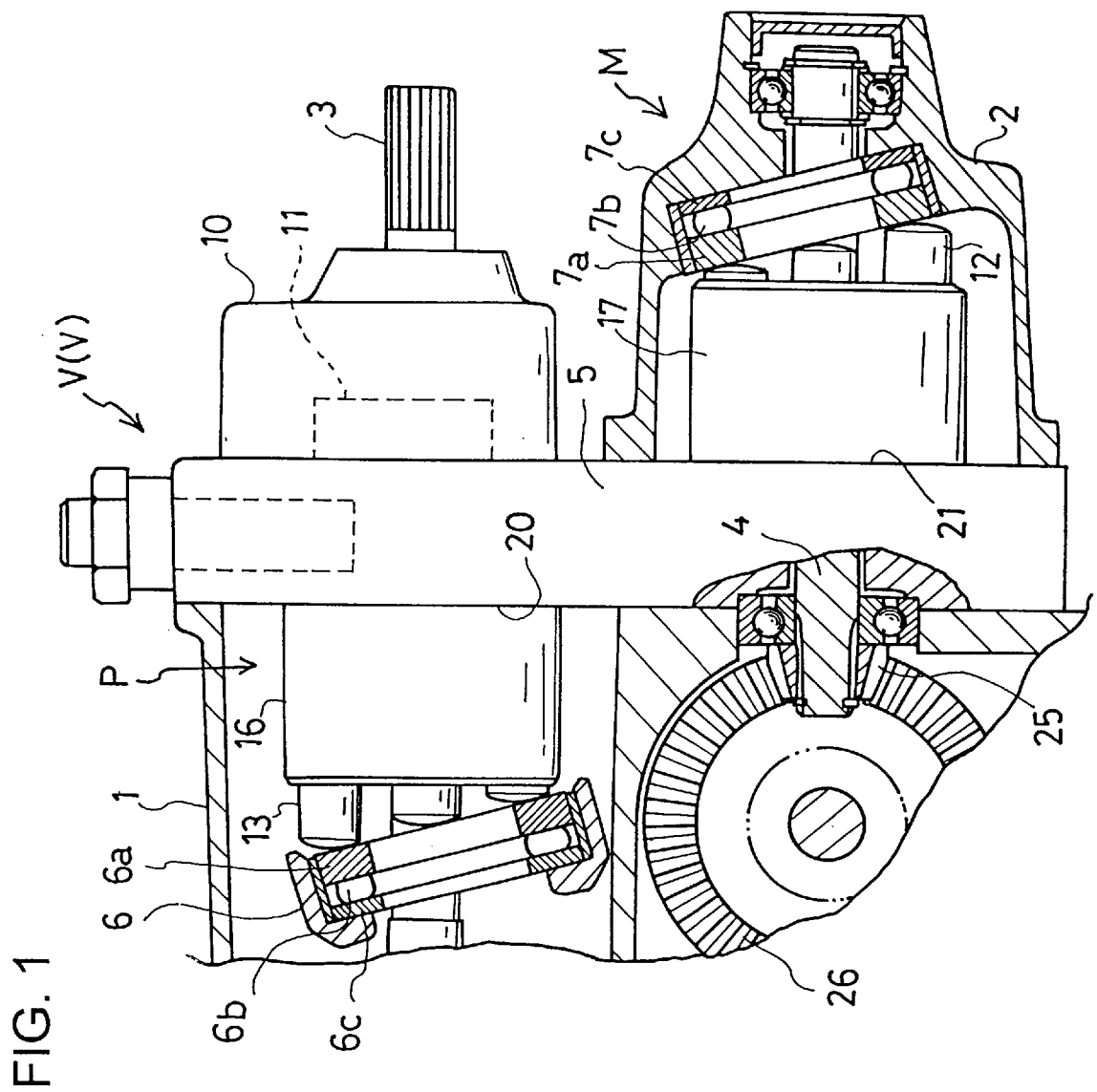
FIG. 1 is a sectional side view of a hydraulic transmission equipped with a hydraulic pump and a hydraulic motor.

In FIG. 1, a center section 5 is mounted to the front surface of a transmission casing 1 and formed as a plate-like member. At the inner surface of center section 5 is formed a pump attaching surface 20, and a cylinder block 16 is rotatably mounted thereon. A plurality of pistons 13 are inserted for reciprocating movement within cylinder block 16. A pump shaft 3 is connected to a rotary axis of cylinder block 16. A thrust plate rotating ring 6a abuts against the heads of pistons 13, and is held, together with a thrust bearing 6b and a thrust plate fixing ring 6c, to a swash plate 6 to form a hydraulic pump P. Pump shaft 3 is connected at the outer end thereof to a drive source, such as an engine E (see FIGS. 3–5), so as to drive hydraulic pump P.

Figure 2:
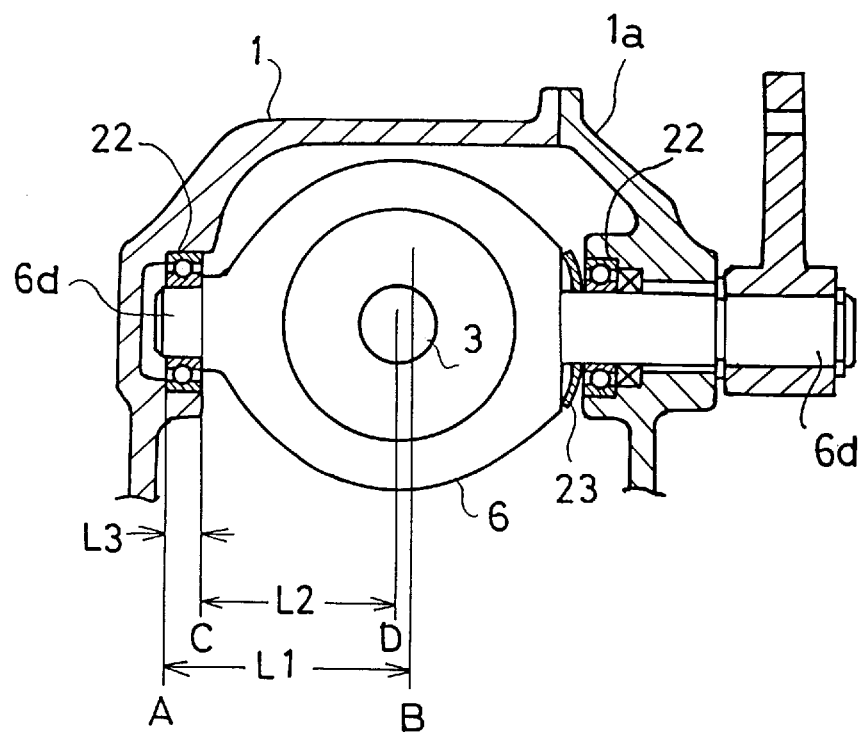
FIG. 2 is a plan view of a swash plate.

Swash plate 6, as shown in FIG. 2, is provided at both sides thereof with a pair of trunnions 6d. Trunnions 6d are rotatably supported by transmission casing 1 and a cover 1a through bearings 22. A speed change arm is fixed to one end of trunnion 6d, so that the arm is turned to change a slanted angle of swash plate 6 so that output of hydraulic pump P can change.

As shown in FIG. 2, a disc spring or spring washer 23 is fitted between a side surface of one of the pair of trunnions 6d, and the inner surface of cover 1a, so that spring washer 23 pushes swash plate 6 laterally of transmission casing 1. Hence, a distance L1 between the position A of the housing for fixing bearing 22 and the central position B of the same, a distance L2 between the position C of swash plate 6 for holding bearing 22 and the central position D of swash plate 6, and a width L3 of bearing 22, are defined only by the allowances or tolerances resulting from manufacturing. These tolerances determine a shift between the center of swash plate 6 and the center of the bearing housing, thereby making the neutral position adjustable. Unless spring washer 23 is used, the tolerance or allowance between the distance from the other side of bearing 22 to the center of the bearing housing, and that from the same to the center of swash plate 6 must be considered, whereby the processing precision becomes strict (tight manufacturing tolerances).

As shown in FIG. 1, at the outer surface of center section 5 is formed a hydraulic motor attaching surface 21, and a cylinder block 17 is rotatably mounted onto motor attaching surface 21. A plurality of pistons 12 are inserted for reciprocating movement into cylinder block 17. A motor shaft 4 is connected to the rotary axis of the cylinder block 17. A thrust plate rotary ring 7a abuts against the heads of pistons 12. Thrust plate rotary ring 7a, together with a thrust bearing 7b and a thrust plate fixing ring 7c, are held in a motor casing 2 to form a hydraulic motor M. A bevel gear 25 is mounted to a portion of motor shaft 4 entering into transmission casing 1 so as to drive, through a bevel ring gear 26, axles (not shown) supported by transmission casing 1.

To the outer surface of center section 5, above motor casing 2, is attached a pump casing 10, in which a trochoid charging pump 11 is disposed. Pairs of kidney ports (not shown) are provided at pump attaching surface 20 and at motor attaching surface 21 of center section 5, respectively. One side circuit 5a and another side circuit 5b are formed in center section 5 for connecting the kidney ports in fluid communication with each other (see FIGS. 3–5). Side circuit 5a and side circuit 5b form a closed fluid circuit for connecting hydraulic pump P and hydraulic motor M in fluid communication with each other.

Figure 3:
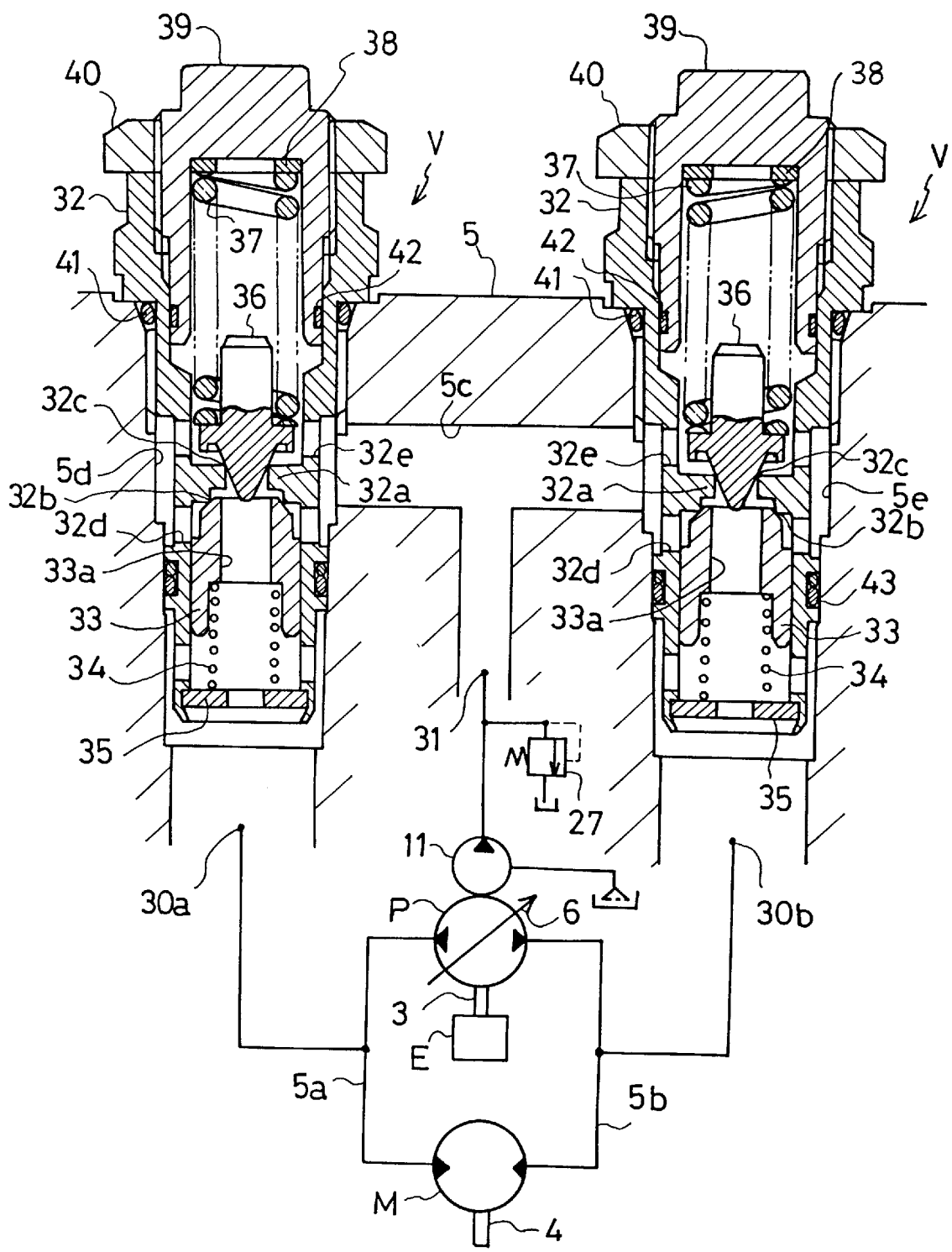
FIG. 3 is a sectional plan view of a first embodiment of the invention, which is integrally provided with a relief valve and a check valve.
Figure 4:
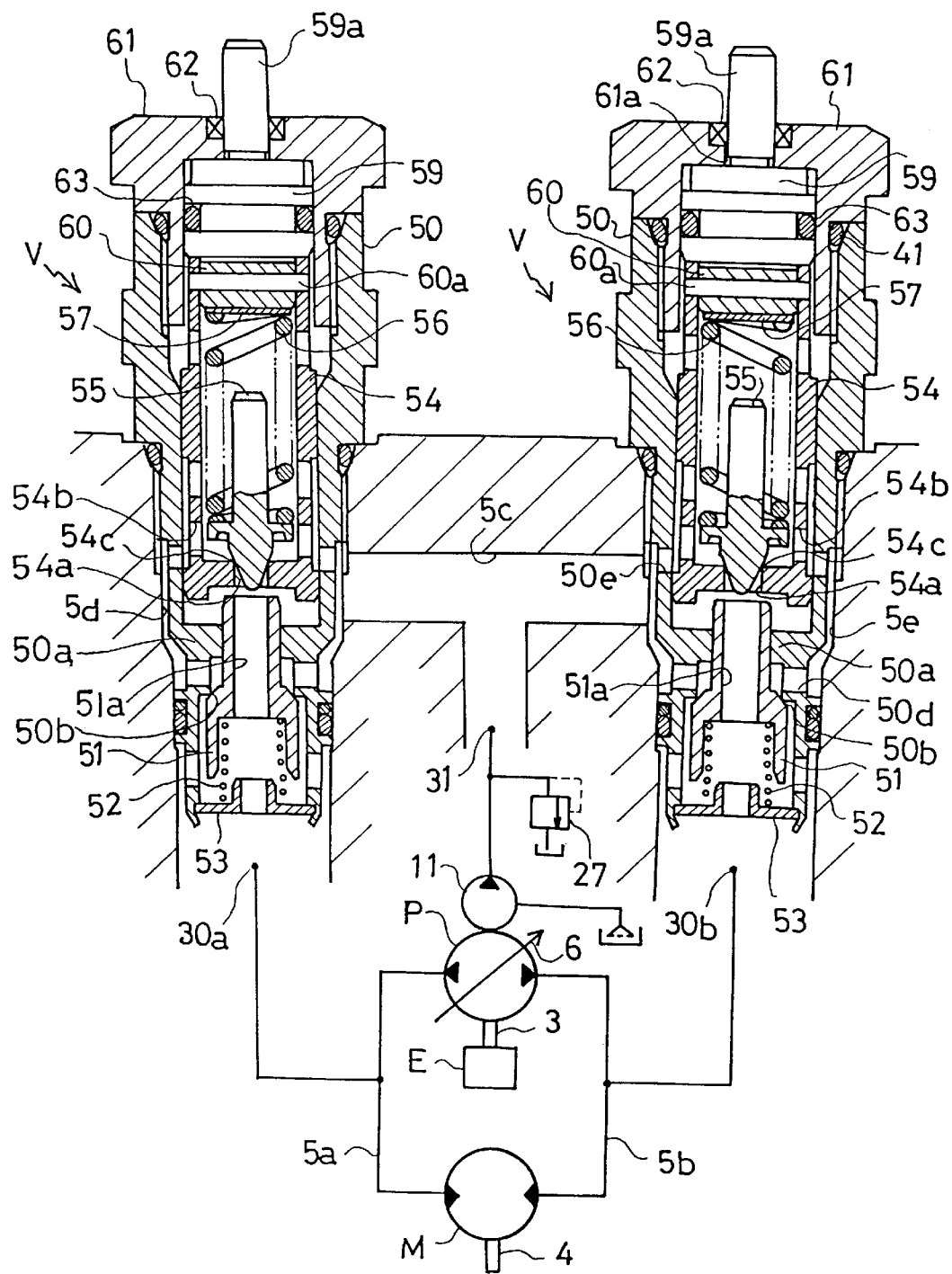
FIG. 4 is a sectional plan view of a second embodiment of the invention.
Figure 5:
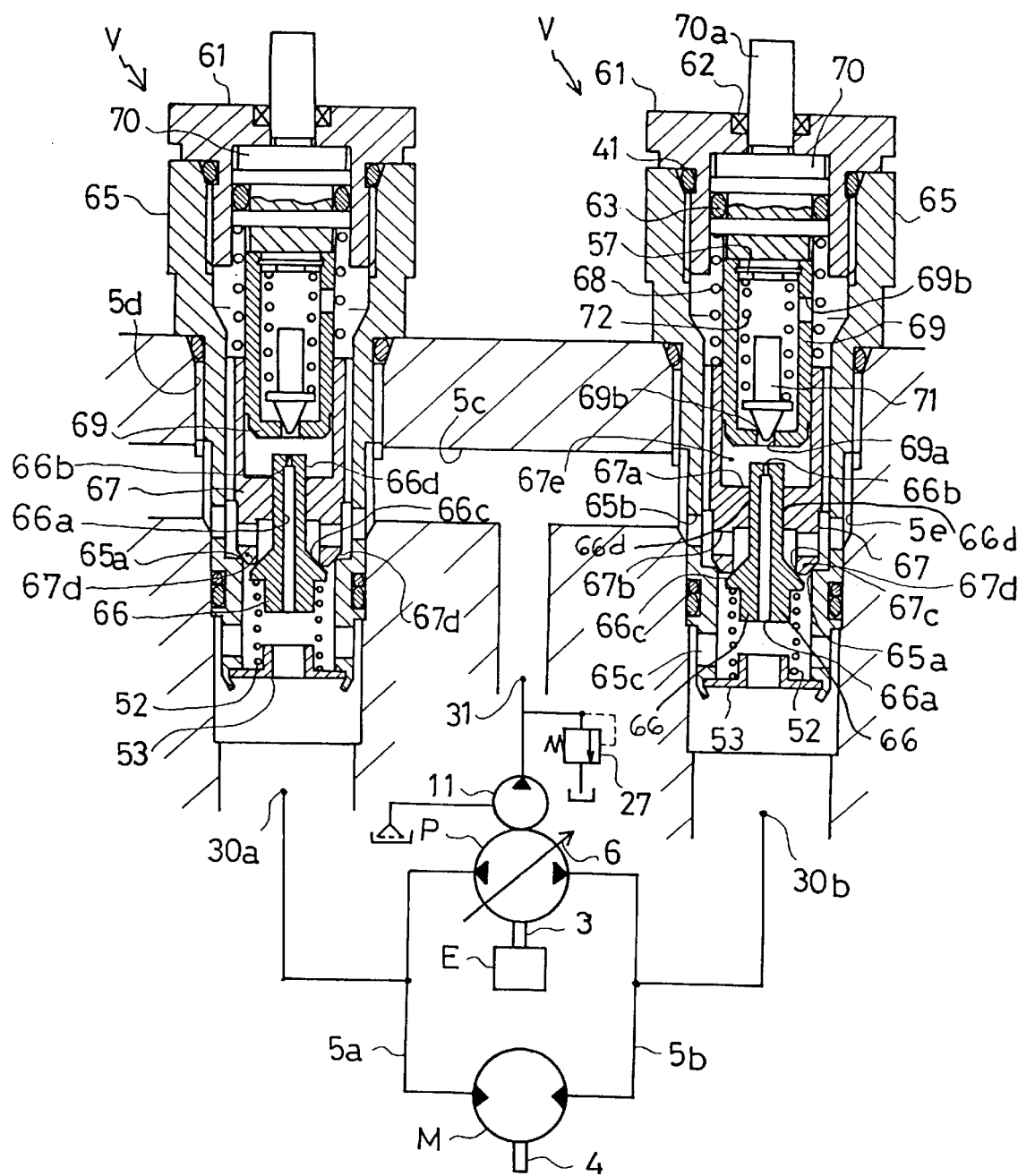
FIG. 5 is a sectional plan view of a third embodiment of the invention.

As shown in FIGS. 3–5, side circuit 5a and side circuit 5b communicate with the discharge side of charging pump 11 through left and right valve units V, each integral with a relief valve and a check valve of the present invention. A supply circuit 5c at the discharge side of charging pump 11 is connected to a low pressure relief valve 27 so as to set supply circuit pressure.

Next, explanation will be given on a first embodiment of valve unit V in accordance with FIG. 3. A pair of bores 5d and 5e are formed at the end surface of center section 5, and communicate with closed circuit ports 30a and 30b branched from side circuit 5a and side circuit 5b, respectively. Bores 5d and 5e communicate at intermediate portions with each other through supply circuit 5c to a supply circuit port 31. Since valve units V, shown left and right in FIGS. 3–5, are of the same construction, the following description will refer to the right side unless otherwise indicated. As shown in FIG. 3, a cylindrical valve casing 32 is screwably inserted into bore 5e through an open end thereof. A partition 32a is formed at a substantially vertical center of valve casing 32, so that the interior of valve casing 32 is divided into a first valve containing chamber and a second valve containing chamber. On the surfaces of partition 32a are formed a first seat surface 32b and a second seat surface 32c. The center of first seat surface 32b and that of second seat surface 32c communicate with each other through a through bore provided in partition 32a. At the outer periphery of valve casing 32 are a communicating bore 32d, connected to the first valve containing chamber and a communicating bore 32e, communicating with the second valve containing chamber, so that the interior of valve casing 32 and supply circuit 5c communicate with each other.

A valve body 33 is disposed in the first valve containing chamber in valve casing 32. A return spring 34, for bringing a conical surface formed at the utmost end of valve body 33 into close contact with first seat surface 32b at partition 32a, and a spring holder 35 for retaining return spring 34, are inserted into the first valve containing chamber, thereby forming a check valve for supplying operating oil. Also, a through bore 33a, communicating with a closed circuit port 30b, is formed at the axially central portion of valve body 33 of the check valve.

In the second valve containing chamber of valve casing 32 are contained a valve body 36 of the relief valve, disposed opposite to the check valve, for regulating the maximum pressure in the closed circuit, a relief spring 37 for bringing a conical surface of valve body 36 into close contact with second seat surface 32c of partition 32a, and a shim 38 for adjusting a biasing force of relief spring 37. The open end of valve casing 32 is closed by a cover 39 for holding or retaining an end of relief spring 37 to thereby form a relief valve whose set pressure is adjustable from the exterior. The utmost end of valve body 36 of the relief valve is disposed to enter into through bore 33a of the check valve, so that the oil pressure from closed circuit port 30b is adapted to act on the utmost end of valve body 36. Hence, through bore 33a of the check valve forms an oil pressure acting chamber with respect to valve body 36 of the relief valve. Cover 39 is detachably, screwably mounted to valve casing 32, and is non-rotatably fixed thereto through a lock nut 40. In addition, reference numerals 41, 42 and 43 designate sealing rings, respectively.

In such construction, when hydraulic pump P is driven, for example, to set side circuit 5a to a high pressure side and side circuit 5b to a low pressure side, high pressure of closed circuit port 30a permanently acts on valve body 36 of the relief valve through through bores 33a of the check valve of valve unit V at the left side in FIG. 3. When the high pressure exceeds the pressure corresponding to the biasing force of relief spring 37, valve body 36 leaves second seat surface 32c for relief operation, so that the relieved oil passes through communicating bore 32e to quickly flow toward supply circuit 5c. Also, the pressure in supply circuit 5c permanently acts on valve body 33 of the check valve through through bore 32d at the right side valve unit V so as to allow valve body 33 of the check valve to leave first seat surface 32b, and pressure oil from charging pump 11 is supplied to side circuit 5b through through bore 33a.

Next, explanation will be given on a second embodiment of valve unit V in accordance with FIG. 4. A cylindrical valve casing 50 is screwably inserted into center section 5 through an opening end of a bore 5e. A partition 50a is formed in valve casing 50, slightly downwardly in the vertical direction as shown in FIG. 4. Valve casing 50 is divided therein into a first valve containing chamber and a second valve containing chamber. At the outer periphery of valve casing 50 are open a communicating bore 50d communicating with the first valve containing chamber, and a communicating bore 50e communicating with the second valve containing chamber, so that the interior of valve casing 50 communicates with supply circuit 5c. A first seat surface 50b is formed at the inner surface of valve casing 50 at a side of the first valve containing chamber.

In the first valve containing chamber are disposed a valve body 51, a return spring 52 for bringing a conical surface of valve body 51 into close contact with first seat surface 50b, and a spring holder 53 for retaining return spring 52, to form a check valve for supplying operating oil. A through bore 51a is open at the central portion of valve body 51 of the check valve, and the utmost end of a cylindrical portion extending from the central portion of valve body 51 perforates partition 50a and extends in proximity to a relief valve casing 54. Bottomed and cylindrical relief valve casing 54 is slidably inserted into the second valve containing room of valve casing 50 to be disposed opposite to the check valve. Communicating bores 54a and 54b, communicating with the second valve containing chamber, are open at the bottom surface and the outer peripheral surface of relief valve casing 54, respectively. The inner surface of the bottom of relief valve casing 54 serves as a second seat surface 54c. Into relief valve casing 54 are inserted a valve body 55, a relief spring 56 for bringing a conical portion of valve body 55 into close contact with second seat surface 54c, and a shim 57 for adjusting a biasing force of relief spring 56.

Valve body 55 of the relief valve is inserted into communicating bore 54a of relief valve casing 54, seated on second seat surface 54c, and disposed opposite to through bore 51a of the check valve. Through bore 51a of the check valve is formed in an oil pressure acting chamber with respect to the relief valve. A spring holder 60 is inserted into an upper opening end of relief valve casing 54, and is fixed by a pin 60a so as to retain the base of relief spring 56. A plunger 59 is provided above relief valve casing 54. A cover 61 is detachably, screwably mounted to valve casing 50 to cover plunger 59 and relief valve casing 54 A bore 61a is open at the center of cover 61, and an urging pin 59a, extending from the center of plunger 59, perforates bore 61a to project outwardly. In addition, reference numerals 62 and 63 designate seal rings, respectively.

In such construction, when hydraulic pump P is driven, for example, to set side circuit 5a to a high pressure side and side circuit 5b to a low pressure side, high pressure of closed circuit port 30a permanently acts on valve body 55 of the relief valve through through bores 51a and 54a at the check valve of the left side valve unit V in FIG. 4. When the pressure exceeds the pressure corresponding to a biasing force of relief spring 56, valve body 55 leaves second seat surface 54c to perform relief operation, and the relieved oil quickly flows to supply circuit 5c through communicating bores 54b. Also, the pressure in supply circuit 5c permanently acts on valve body 51 of the check valve through communicating bores 50d of the right side valve unit V in FIG. 4 so that valve body 51 leaves first seat surface 50b, thereby supplying pressure oil from charging pump 11 to side circuit 5b.

When plungers 59 are simultaneously manually pushed down through urging pins 59a, relief valve casings 54 are pushed down. The upper ends of valve bodies 51 of the check valves that abut against the bottoms of relief valve casings 54 are also moved lower, and valve bodies 51 of the check valves leave first seat surfaces 50b respectively, thereby enabling the high pressure side and low pressure side of the closed circuit to be by-passed. Also, each cover member 61 may be removed from valve casing 50, to enable relief valve casing 54 to be removed therefrom, so that the thickness of shim 57 in relief valve casing 54 can be changed to enable the relief pressure to be adjusted.

Next explanation will be given on construction of a third embodiment of valve unit V in accordance with FIG. 5. In each valve unit V, a cylindrical valve casing 65 is screwably inserted into a bore 5d. In valve casing 65 are contained, vertically in order from below, a spring holder 53, a return spring 52, a check valve 66, a balance piston valve 67, a relief valve casing 69, and a plunger 70. Valve casing 65 is closed by a cover 61.

A valve body 66 of the check valve comprises a conical portion 66c and a round bar 66d axially extending from the center of conical portion 66c. At the lower end thereof is formed a seat for spring 52, and the base of conical portion 66c is upwardly biased by spring 52 retained by spring holder 53. At the axis of valve body 66 is open a communicating bore 66a. At the upper end of round bar 66d is formed an orifice 66b communicating with communicating bore 66a. Round bar 66d is inserted into a through bore at a partition 67a to be discussed below, and the upper end of the same upwardly projects from partition 67a.

Balance piston valve 67 is pipe-like-shaped and forms therein partition 67a for partitioning a substantially vertically central portion of balance piston valve 67. Communicating bores 67b are open at the outer periphery of balance piston valve 67 below partition 67a. A first seat surface 67c is formed at the inner periphery of the lower end of balance piston valve 67, so that conical portion 66c of check valve 66 is brought into close contact with first seat surface 67c.

A conical portion 67d is formed at the outer periphery of the lower end of balance piston valve 67. A second seat surface 65a is formed in valve casing 65, and the upper end of balance piston valve 67 abuts against a spring 68, so that conical portion 67d is biased by spring 68 to come into close contact with second seat surface 65a. Communicating bores 65b, communicating with supply circuit 5c, are open at the outer periphery of valve casing 65 positioned above second seat surface 65a. At the outer periphery of valve casing 65 positioned below second seat surface 65a are open communicating bores 65c communicating with closed circuit ports 30a and 30b, respectively.

Round bar 66d of check valve 66 is inserted into the through bore at partition 67a, relief valve casing 69 is inserted into balance piston valve 67 opposite to the utmost end of round bar 66d, and the inserted spatial portion of relief valve casing 69 forms an oil pressure acting chamber 67e in the relief valve. Relief valve casing 69 is formed in a bottomed hollow cylindrical shape, and at the bottom and outer periphery of the same are open communicating bores 69a and 69b, respectively Within relief valve casing 69 are inserted a pilot valve 71, a spring 72 for biasing pilot valve 71 toward the bottom, and a shim 57 for adjusting the biasing force of spring 72, so that the conical portion of pilot valve 71 is formed to come into close contact with the opening end of communicating bore 69a.

The upper end of each relief valve casing 69 abuts against the lower end of a plunger 70, and an urging pin 70a projects from the upper end of plunger 70. A cover member 61 is detachably screwably mounted to valve casing 65 to cover plunger 70, and urging pin 70a outwardly projects from cover 61.

In such construction, when the hydraulic pump P is driven, for example, to set side circuit 5a at high pressure and side circuit 5b at low pressure, high pressure of closed circuit port 30a permanently acts on the valve body of pilot valve 71 through an orifice from communicating bore 66a of check valve 66 of the left side valve unit V in FIG. 5. When the acting pressure is under or below the pressure corresponding to the biasing force of spring 72, oil pressure acting on the lower surface of balance piston valve 67 and that acting on oil pressure acting chamber 67e balance with each other, and conical portion 67d of balance piston valve 67 is pressed onto second seat surface 65a by spring 68. When the pressure exceeds the biasing force of spring 72, pilot valve 71 leaves communicating bore 69a to perform the relief operation. As a result, the pressure in oil pressure acting chamber 67e is decreased and the oil pressure acting on the lower end surface of balance piston valve 67 exceeds the pressure in oil pressure acting chamber 67e, whereby conical portion 67d of balance piston valve 67 leaves second seat surface 65a to perform the relief operation and the relieved oil quickly flows to supply circuit 5c through communicating bores 67b and 65b.

Pressure in supply circuit 5c permanently acts on conical portion 66c of check valve 66 through communicating bores 65b at the right side valve unit V in FIG. 5. When the pressure in supply circuit 5c exceeds the sum of the biasing force of spring 52 plus the oil pressure in closed circuit port 30b, conical portion 66c leaves first seat surface 67c. Hence, pressure oil from charging pump 11 is supplied to the low pressure side of the closed circuit through communicating bores 65b and 67b.

As in the second embodiment discussed above, when plungers 70 are simultaneously pushed down, relief valve casings 69 are pushed down and the utmost ends of round bars 66d of check valves 66 that abut against the bottoms of relief valve casings 69 are also pushed down. Check valves 66 are thereby opened, whereby the high pressure side and low pressure side of the closed circuit can be by-passed. Also, when cover member 61 is removed from valve casing 65, relief valve casing 69 can simultaneously be removed, and the thickness of shims 57 can be changed to enable the relief pressure to be adjusted.

Although the invention has been described with reference to several different embodiments, these embodiments are merely exemplary and not limiting of the invention which is defined solely by the appended claims and their equivalents.

What is claimed is:

1. A hydrostatic transmission, comprising:
   a hydraulic motor;
   a hydraulic pump; and
   a closed circuit having a low pressure side and a high pressure side for connecting said hydraulic pump and said hydraulic motor in fluid communication with each other, wherein said closed circuit includes,
   a valve casing,
   a check valve disposed within said valve casing, wherein said check valve allows oil to be supplied only to the low pressure side of said closed circuit,
   a relief valve disposed opposite to said check valve within said valve casing, wherein said relief valve regulates oil pressure within said closed circuit, and
   a cover detachably mounted to an end of said valve casing.

2. The hydrostatic transmission of claim 1, further comprising:
   a relief spring disposed within said valve casing and retained by said cover.

3. The hydrostatic transmission of claim 2, further comprising:
   a shim disposed within said valve casing for adjusting a biasing force of said relief spring.

4. A valve assembly for use in a closed circuit of a hydrostatic transmission, comprising:
   a valve casing;
   a check valve disposed within said valve casing, wherein said check valve allows oil to be supplied only to a low pressure side of the closed circuit;
   a relief valve disposed opposite to said check valve within said valve casing, wherein said relief valve regulates pressure within the closed circuit; and
   a cover detachably mounted to an end of said valve casing.

5. The valve assembly of claim 4, further comprising:
   a relief spring disposed within said valve casing and retained by said cover.

6. The valve assembly of claim 5, further comprising:
   a shim disposed within said valve casing for adjusting a biasing force of said relief spring.

7. The valve assembly of claim 4, wherein said check valve comprises:
   a valve body; and
   a bore formed within said valve body.

8. A valve assembly for use in a closed circuit of a hydrostatic transmission, comprising:
   a valve casing;
   a check valve disposed within said valve casing, wherein said check valve allows oil to be supplied only to a low pressure side of the closed circuit;

a relief valve casing;

a relief valve disposed within said relief valve casing, said relief valve casing slidably disposed within said valve casing so that said relief valve is disposed opposite to said check valve, wherein said relief valve regulates oil pressure within the closed circuit; and a cover detachably mounted to an end of said valve casing.

9. The valve assembly of claim 8, wherein said check valve comprises:

a valve body; and a bore formed within said valve body.

10. The valve assembly of claim 9, wherein said valve body extends in proximity to said relief valve casing.

11. The valve assembly of claim 9, further comprising:

a plunger covered by said cover for urging said relief valve casing and said valve body to move in a direction suitable for bypassing a high pressure side and the low pressure side of the closed circuit.

12. The valve assembly of claim 8, further comprising:

a plunger covered by said cover, wherein said plunger allows the closed circuit to be bypassed.

13. The valve assembly of claim 8, further comprising:

a partition for dividing said valve casing into a first valve containing chamber for housing said check valve and a second valve containing chamber for housing said relief valve.

14. The valve assembly of claim 8, further comprising:

a relief spring disposed within said relief valve casing; and a shim disposed within said relief valve casing for adjusting a biasing force of said relief spring.

15. A valve assembly for use in a closed circuit of a hydrostatic transmission, comprising:

a valve casing;

a check valve disposed within said valve casing, said check valve comprising a valve body and an orifice communicating with a bore formed within said valve body, wherein said check valve allows oil to be supplied only to a low pressure side of the closed circuit; and a relief valve disposed within said valve casing, said relief valve comprising a balance piston valve and a pilot valve, wherein pressure within the closed circuit acts on said pilot valve through said orifice and said bore to thereby regulate pressure within the closed circuit.

16. The valve assembly of claim 15, further comprising:

a cover detachably mounted to one end of said valve casing.

17. The valve assembly of claim 16, further comprising:

a plunger covered by said cover, wherein said plunger allows the closed circuit to be bypassed.

18. The valve assembly of claim 15, further comprising:

a relief valve casing disposed within said valve casing, wherein said pilot valve is disposed within said relief valve casing.

19. The valve assembly of claim 18, further comprising:

a spring disposed within said relief valve casing for biasing said pilot valve toward the bottom of said relief valve casing; and a shim disposed within said relief valve casing for adjusting a biasing force of said spring.

20. The valve assembly of claim 18, further comprising:

a cover detachably mounted to one end of said valve casing; and a plunger covered by said cover for urging said relief valve casing to abut said check valve, thereby opening said check valve to bypass a high pressure side and the low pressure side of the closed circuit.

* * * * *